United States Patent [19]

Spence

[11] 4,158,993
[45] Jun. 26, 1979

[54] SELECTIVE PEACH PITTER

[75] Inventor: Henry L. Spence, Pleasanton, Calif.

[73] Assignee: Filper Corporation, Reno, Nev.

[21] Appl. No.: 852,376

[22] Filed: Nov. 17, 1977

Related U.S. Application Data

[63] Continuation of Ser. No. 609,874, Sep. 2, 1975, abandoned.

[51] Int. Cl.² .......................... A23N 4/04; A23N 4/22
[52] U.S. Cl. ........................................ 99/486; 99/551; 99/553; 99/554; 426/485
[58] Field of Search ................................ 99/489–491, 99/544–545, 547, 551–554, 562; 426/485

[56] References Cited

U.S. PATENT DOCUMENTS

| | | |
|---|---|---|
| 1,785,005 | 12/1930 | Duncan |
| 1,785,019 | 12/1930 | Thompson |
| 1,785,021 | 12/1930 | Whipple |
| 1,785,022 | 12/1930 | Duncan |
| 2,826,227 | 3/1958 | Perrelli et al. ............ 99/551 |
| 3,331,418 | 7/1967 | Amori |
| 3,442,513 | 5/1969 | Cudd |
| 3,465,799 | 9/1969 | Tomelleri |
| 3,633,641 | 1/1972 | Tomelleri |
| 3,829,591 | 8/1974 | Browne .................... 99/553 |
| 3,835,765 | 9/1974 | Tomelleri |

FOREIGN PATENT DOCUMENTS

636141 1/1928 France.

Primary Examiner—Harvey C. Hornsby
Assistant Examiner—Timothy F. Simone

[57] ABSTRACT

A torque-type pitter for pitting drupes such as clingstone peaches and the like, having coplanar, body-bisecting and pit-holding blades, and coaxial elements for gripping the peach body at opposite sides of the plane of said blades for twisting the peach halves from the blade-held pit. One of said blades has pitting knives or a pitting spoon in the plane of said blade that are normally inoperative where the pit in the peach between the blades is sound, or momentarily appears to be sound, but upon said blade passing between the halves of a split pit without hesitation, said knives or spoon will automatically be projected into the gripped halves to positions in which the rotation of said halves by said elements will spoon-pit the halves. Where a pit is momentarily engaged by the pair of pit-holding blades as though it were sound and then the blades travel past the edges of the defective (or "late" split) pit, the pitting knives will remain in inoperative in the plane of the blade, thereby precluding mutilation of the halves as would occur were the knives to engage the pit or to cut remote from the pit during rotation of the bisected halves.

6 Claims, 12 Drawing Figures

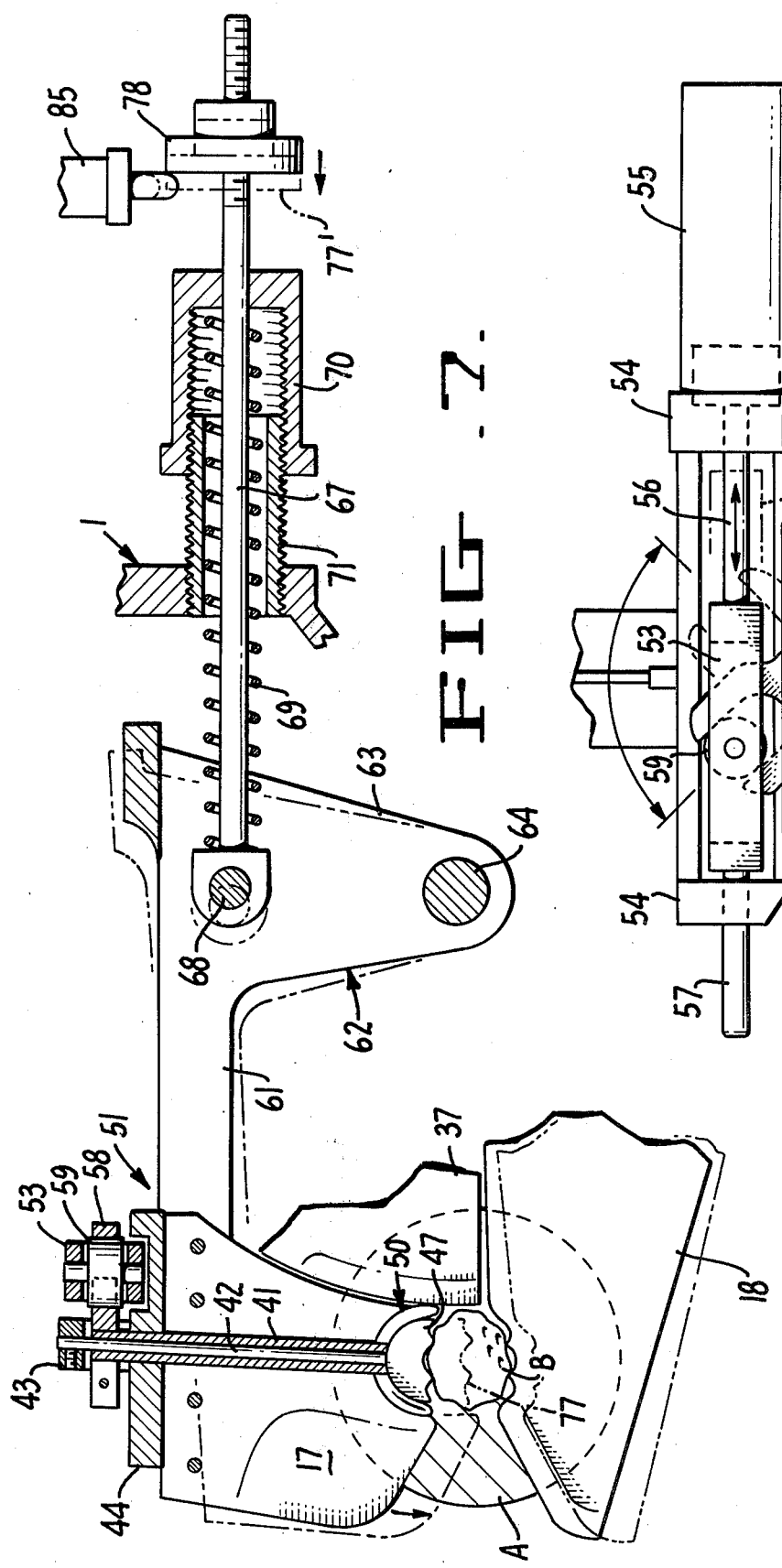

SELECTIVE PEACH PITTER

This is a continuation of application Ser. No. 609,874, filed Sep. 02, 1975, abandoned.

BACKGROUND OF INVENTION

It is not uncommon for any given run of clingstone peaches to include in random assortment some with sound pits, which can be pitted by twisting or torquing the peach halves from the held pit, and some with unsound or split pits, which cannot be so pitted.

Heretofore the halves of clingstone peaches pitted by torque-type drupe pitters, such as shown and described in U.S. Pat. No. 2,826,227, issued Mar. 11, 1958, have been separated, after bisection of the peaches, into two classes, one being the halves and sound pits from which the halves have been twisted, and the other class being the halves containing the pit halves of peaches in which the pits were unsound or split precluding holding or gripping by the pit-holding blades that therefore bisected the whole peach body and the pit.

Such separation or segregation has been accomplished either by manual inspection and selection or automatically by incorporating in the torque pitter a diverter such as that disclosed in U.S. Pat. No. 3,442,313, issued May 6, 1969, Either of these operations made necessary to expensive step of rehandling and repitting those peach halves containing pit-halves, by subsequent torque or spoon pitting.

It has also been proposed heretofore to "convert" a torque pitter from its normal operation of twisting the peach halves loose from a held pit to a spoon pitting operation, such as disclosed in U.S. Pat. No. 3,829,591, issued Aug. 14, 1974. The difficulty with the latter proposal is that it requires a replacement of parts (the cutting spoon and associated mechanism for the pit-gripping edges on the blades) and, when converted, the pitter cuts or cores the pits from all peaches presented to it. Since the percentage of peaches having split pits in any crop varies greatly and is not subject to segregation prior to pitting, the converted pitter operating only in the spoon pitting mode eliminates the advantages and economics of torque pitting with respect to all the peaches with sound pits.

SUMMARY

In the present invention, the same pitter without modification, performs the normal torque pitting of peaches having sound pits substantially as disclosed in above mentioned Pat. No. 2,826,227, automatically detects those peaches having split pits and spoon cuts such pits from the peach halves, and merely bisects those peaches having pits that split after engagement by the pit-holding blades or initial twisting by the peach-gripping elements. As with a standard torque pitter, the diverter of U.S. Pat. No. 3,442,313, although not part of this invention, may be incorporated to separate the torque-pitted halves from the spoon-pitted halves and those that contain "late" split pits, the latter being readily separated by inspection from the spoon-pitted halves.

One of the objects of the invention is the provision of a pitter that will automatically torque pit clingstone peaches having sound pits and spoon pit clingstone peaches having split pits presented randomly and indiscriminately thereto.

Another object of the invention is the provision of a torque-pitter that will torque pit clingstone peaches having sound pits, will spoon pit clingstone peaches having split pits, and will bisect clingstone peaches having "late" split pits upon the pit being gripped as for torque-pitting and the halves of the peach body rotated upon the peaches being indiscriminately fed thereto.

A still further object of the invention is a method of pitting clingstone peaches at a single pitting station by twisting bisected peach-bodies from peaches having sound pits and by cutting the pit-halves of split pits from the bisected halves of drupes having split pits upon feeding the peaches of a succession of clingstone peaches to the pitting station with peaches having pits of the two named characteristics indiscriminately positioned in the succession relative to each other.

Yet another object of this invention is the provision of a drupe pitter that can be operated in any one of three different modes merely by making simple adjustments, an all torque mode in which all peaches presented to the pitter are torque pitted, an all spoon mode in which all the peaches presented to the pitter are spoon pitted, and a selective mode in which the peaches presented are automatically either torque pitted or spoon pitted depending on the soundness of the pit.

Other objects and advantages will appear from the drawings and description.

DESCRIPTION OF DRAWINGS

FIG. 7 is an enlarged part sectional, part elevational view of the peach-bisecting blades gripping a sound pit, and the means for actuating the pitting spoon if the pit is split.

FIG. 8 is a fragmentary enlarged top plan view of a portion of the spoon actuating means shown in FIG. 7.

DETAILED DESCRIPTION

Figure 9:
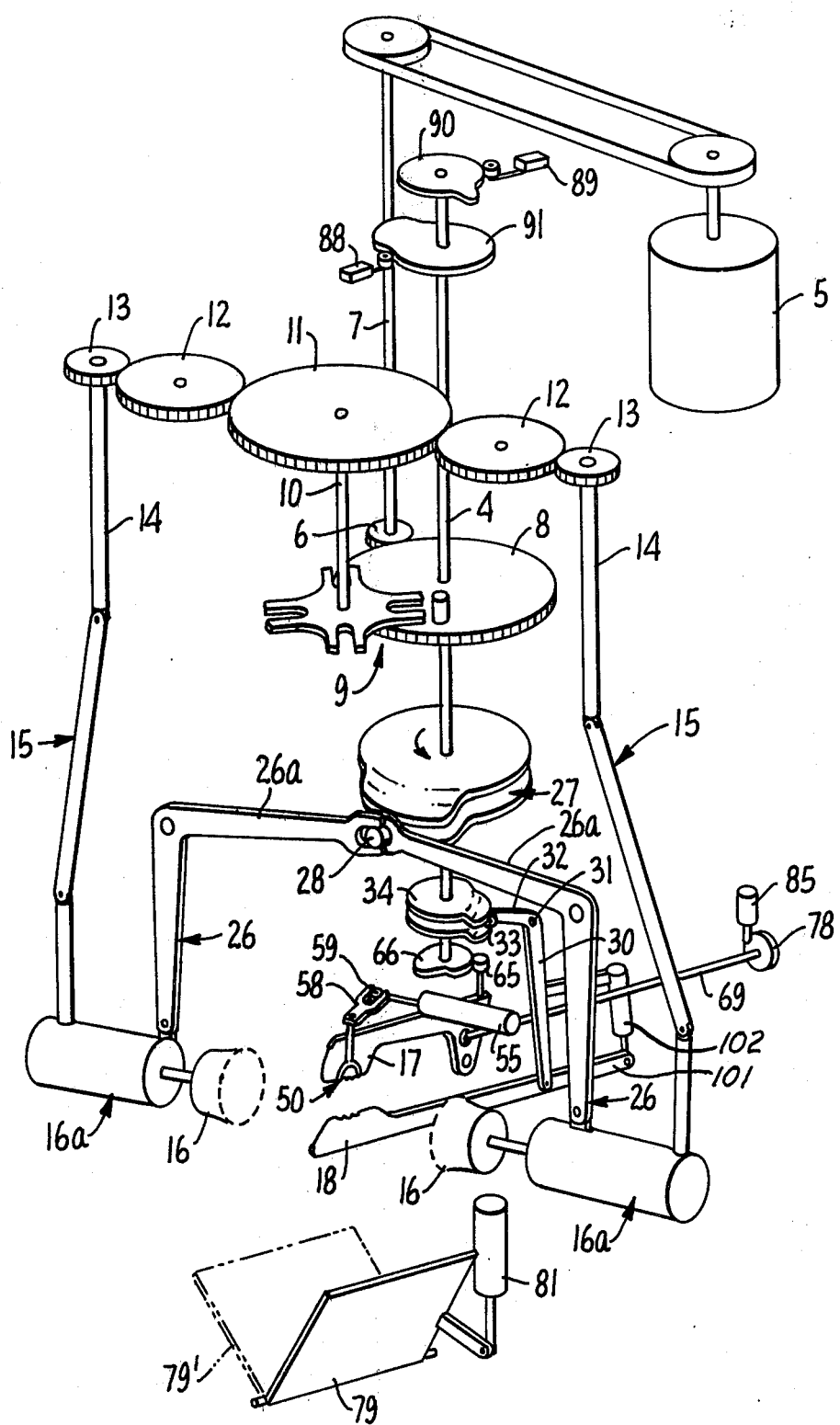
FIG. 9 is a semi-schematic, isometric view of the elements of the control system in relation to the pitter actuating elements with which the disclosed embodiment of present invention is operatively connected.

A stationary frame, generally designated 1 (FIG. 1), includes a housing 2 supported on and above base members 3. A vertically extending main cam shaft 4 extends through and is rotatably supported within said housing for continuous rotation by a motor 5 (FIG. 9) through a pinion 6 on motor driven shaft 7 connected with a gear 8 on cam shaft 4. A Geneva drive, generally designated 9, intermittently connects gear 8 with shaft 10 that, in turn, has a gear 11 thereon which drives a pair of idler gears 12. Gears 12 drive pinions 13 of the same size, which pinions are each on a separate shaft 14. Flexible driving connections, generally designated 15, connect shafts 14 with horizontally spaced, opposed, coaxial drupe-gripping elements or cups 16, such as disclosed in U.S. Pat. No. 3,353,860 issued Nov. 21, 1967, to K. E. Meissner, mounted on drive means 16a.

Figure 1:
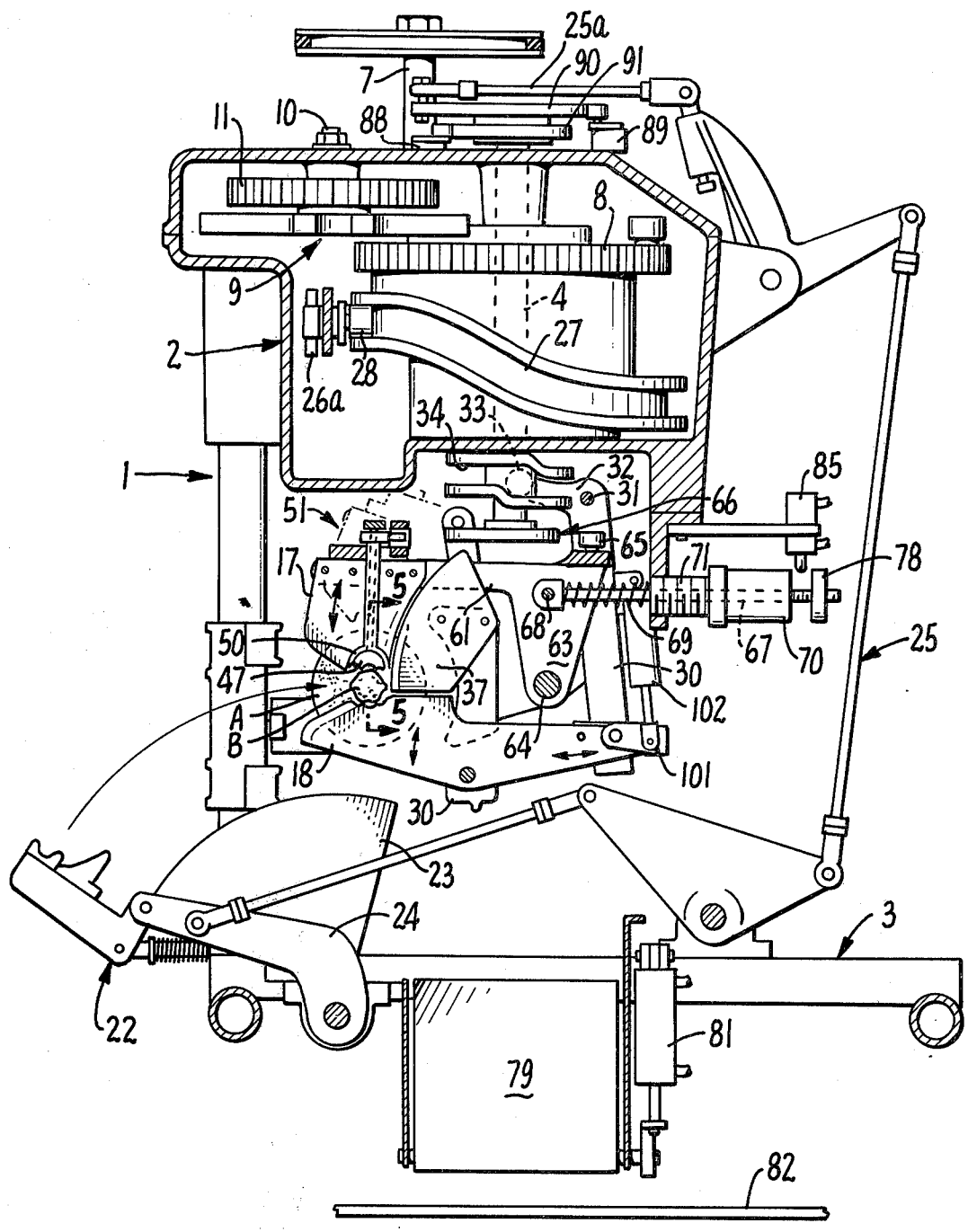
FIG. 1 is a part sectional, part elevational view of the main portion of a pitter incorporating an embodiment of the present invention.
Figure 2:
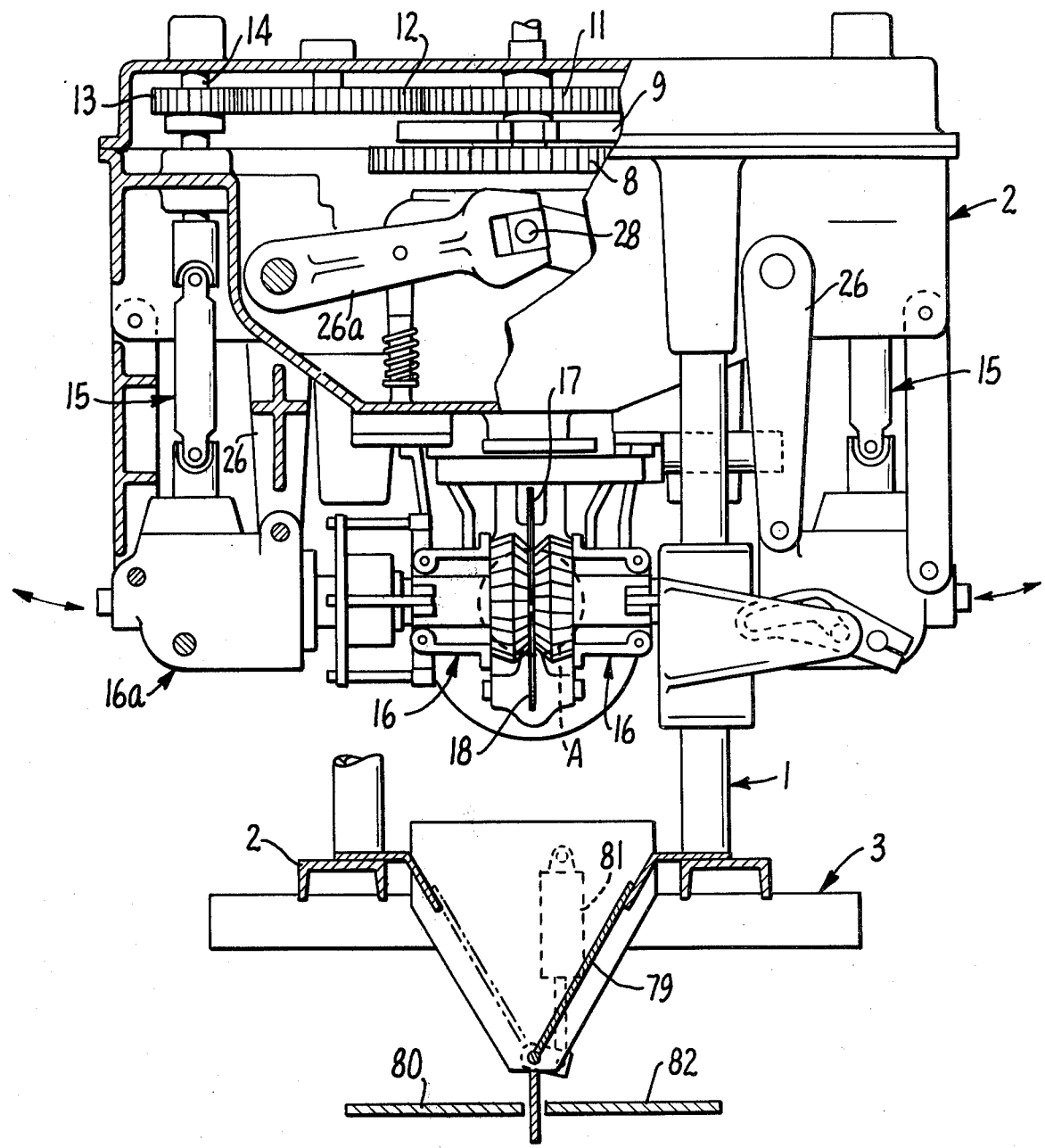
FIG. 2 is a part sectional, part elevational view of the pitter of FIG. 1 as seen at right angles to the latter.

Elements 16 are positioned at two opposite sides of coplanar upper and lower pit-holding and peach-bisecting blades 17, 18, that are in a vertical plane disposed at substantially right angles to the axis of the drupe-gripping elements 16 (FIGS. 1, 2). Said elements are oppositely rotated by drive means 16a upon rotation of pinions 13 through the actuation of the Geneva drive 9 by rotation of shaft 4.

The foregoing structure is disclosed and described in the United States patents hereinbefore noted, with the exception that the ratio of the gears 11-13 relative to each other is such that, upon actuation of the Geneva drive the drupe-gripping elements 16 will be rotated through 360 degrees instead of through 270 degrees.

As also disclosed in U.S. Pat. No. 2,826,227 a drupe feeder, generally designated 22 (FIG. 1), carries a pit and drupe receiver 23 for receiving drupe halves and pits after each pitting operation, and for discharging them. Said receiver and feeder are carried by and between arms 24 pivoted on base 3 for swinging movement from a drupe-impaling position (FIG. 1) to a drupe-bisecting and discharge position and vice versa upon actuation of a linkage, generally designated 25, by a crank 25a secured on the upper end of shaft 4 (FIG. 1) between each pitting operation.

Crank arms 26 (FIGS. 2, 9) support the drupe-gripping elements 16 carried by drive means 16a for swinging toward and into gripping relation with the opposite sides of a drupe positioned between the bisecting blades 17, 18, and then away from the drupe after rotation of elements 16. A drum cam 27 (FIGS. 1, 9) secured on shaft 4 guides a follower 28 that is pivoted at the end of one of the arms 26a (FIG. 2) of each crank 26 for swinging the drupe-engaging elements 16 into and out of drupe-engaging and twisting relation to the drupe halves during and after bisection of the drupe.

The common axis of elements or cups 16 when in position gripping the opposite outer sides of a peach A extends generally centrally through the pit B of said peach.

The lower blade 18 is supported for generally horizontal reciprocatory movement at the lower ends of upwardly extending arms 30 (FIGS. 1, 9) that are pivoted at 31 to a portion of housing 2. A short lateral extension 32 of the upper end of one of arms 30 carries a cam follower 33 disposed in a drum cam track 34 that is on shaft 4. After each pitting operation and when the upper blade 17 is moved upwardly to release the pit, the lower blade 18 will be moved rearwardly through actuation of the cam 34 and arms 30 to dislodge the pit from blade 18 should it be stuck.

The rear end of lower blade 18 (remote from the pit-gripping edges) is also provided with a pivoted extension 101 which is connected to an air cylinder 102. During the spoon pitting mode only actuation of cylinder 102 pivots extension 101 thereby tilting lower blade 18 about its central pivot. This results in the lowering of the forward end of blade 18 (FIGS. 6, 6A, and in dot-dash line, FIG. 7) to remove the pit-gripping teeth thereon from the pitting area so as to not interfere with the spoon pitting operation.

In the disclosed embodiment of present invention, the upper pit-holding blade 17 is formed with a central, vertically elongated slot 40 (FIGS. 3, 4) having concave opposedly facing surfaces (FIG. 4) for rotatably supporting a cylindrical stem 41 extending longitudinally of the slot between said surfaces, which stem, in turn is rotatably supported on a stationary cylindrical rod 42. Said rod 42 is held fixed at its upper end in a bracket 43 (FIG. 3) on a member 44 that is rigid with a frame 51 and upper blade 17.

The lower portion of the upper pit-holding and drupe-bisecting blade 17 is formed with a downwardly opening recess 46 (FIGS. 3, 4) having a bottom edge extending substantially semi-circularly downwardly from opposite sides of the lower end of slot 40. Rigidly secured to the lower end of rod 41 is the pit-gripping portion 47 of the upper blade 17, which portion is spaced from the arcuately downwardly extending edges of recess 46 to form therewith slots 48 extending arcuately downwardly and outwardly from opposite sides of the lower end of the vertical slot 40. Said portion 47 is formed with pit-engaging and gripping teeth 49 along its lower horizontally extending edge similar to the upwardly facing pit-gripping teeth on lower blade 18.

Extending arcuately outwardly and downwardly in an inverted U-shape from and rigid with the lower end of the hollow stem 41 and positioned in slots 48 is a pitting or coring spoon 50. The arms of knives 50' of spoon 50 follow the circularly extending legs of slot 48 and terminate at their lower ends at points substantially at the lower edge of pit-gripping means 47 or the upper edge of a sound pit A held between the upper and lower blades 17, 18. The pit-gripping means 47 is considered part of the upper blade 17. The pitting knives 50 are normally coplanar with the upper blade 17 and will remain in the slots 48 when a sound pit in the drupe is encountered by teeth 49 and the peach is torque pitted.

Figure 6:
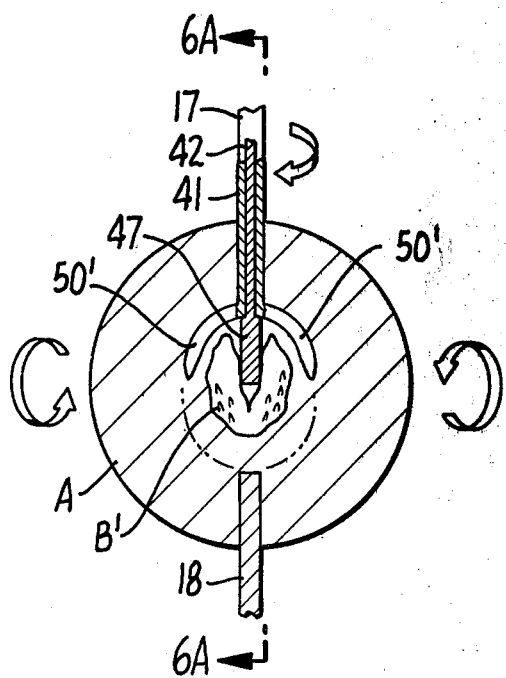
FIG. 6 is a view similar to that of FIG. 5 showing the pit-holding blades having passed between the halves of a split pit and with the pitting spoon extended to sever the pit halves from the peach halves upon twisting the latter.

The member 44 (FIG. 3) is the base of a frame, generally designated 51 (FIG. 8), that supports the mechanism for moving the pitting knives or spoon 50 from their positions coplanar with blade 17 within slots 48 to and from the outwardly projecting positions shown in FIG. 6 in which they extend transversely of blade 17 in a vertical plane that is generally at a right angle to the plane of said blade.

A hollow, horizontally elongated block 53 is supported on the frame 51 for longitudinal movement between upstanding end members 54 on said frame. An air actuated cylinder 55 extends outwardly from one of the members 54 (FIG. 8) and its plunger rod 56 connects with one end of block 53, while a guide rod 57 projecting from the other end of the block slidably extends through the other end member 54.

Figure 3:
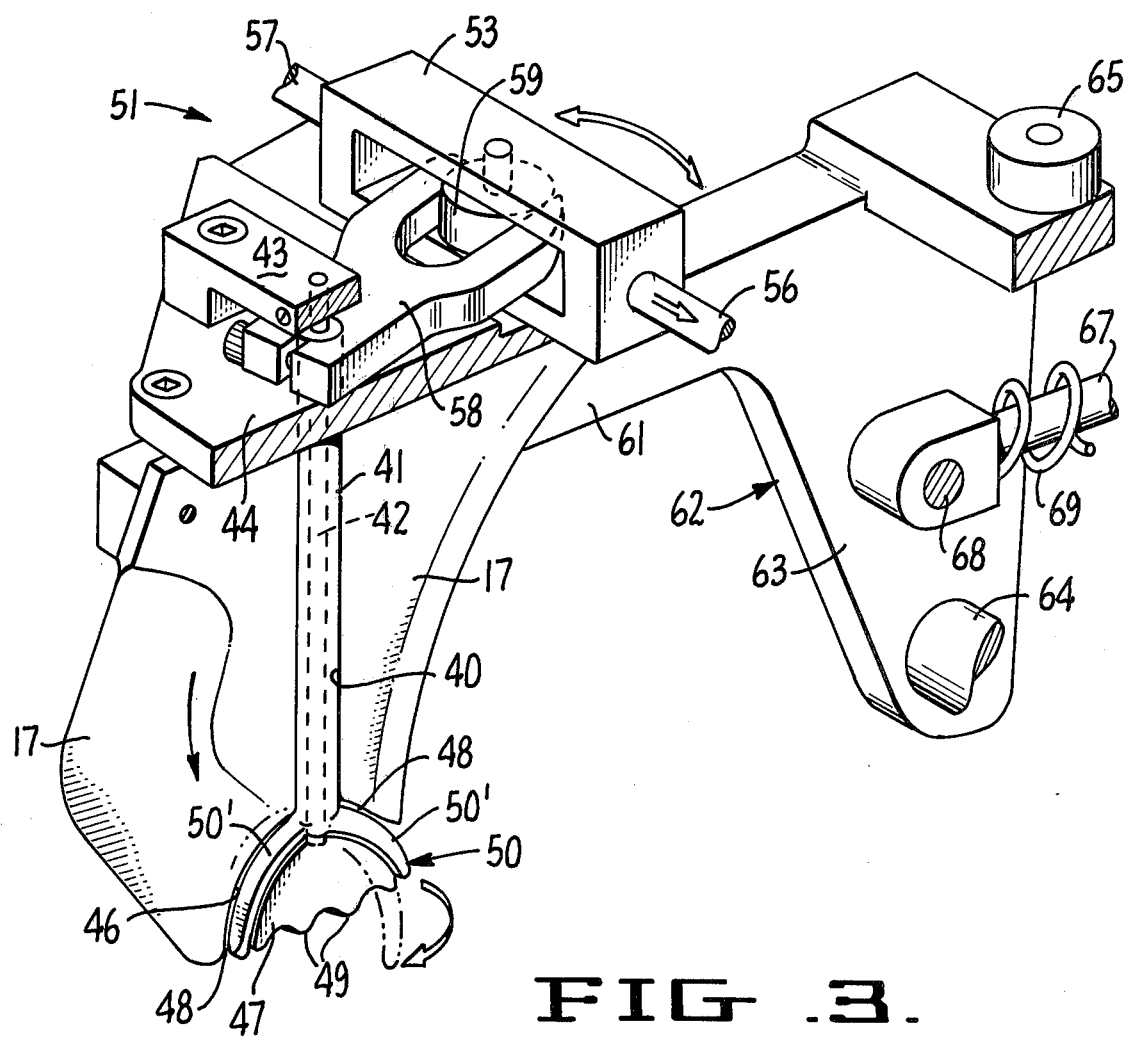
FIG. 3 is an enlarged, fragmentary isometric view of the upper peach bisecting blade and pitting spoon of the pitter of FIG. 1.
Figure 4:
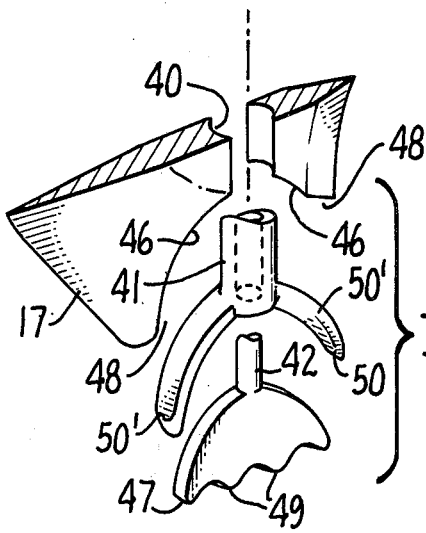
FIG. 4 is an enlarged, fragmentary, exploded view of the pitting spoon and parts adjacent thereto.
Figure 5:
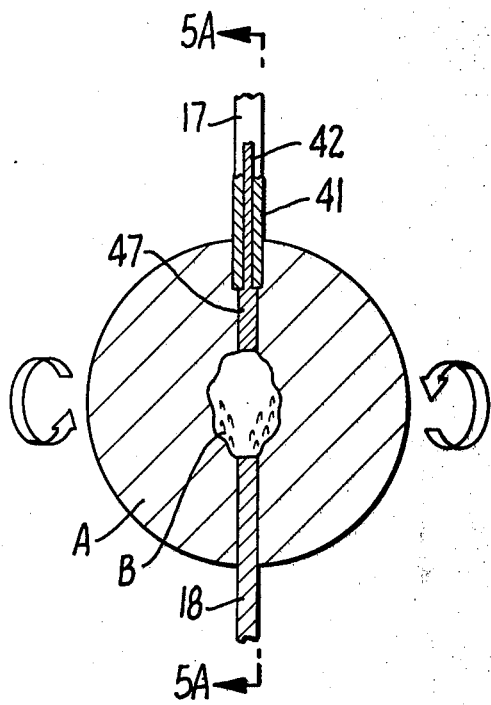
FIG. 5 is an enlarged vertical sectional view through a peach having a sound pit and the pit-holding blades as seen from line 5—5 of FIG. 1. The arrows indicate the 360 degree twist of the peach halves.
Figure 5A:
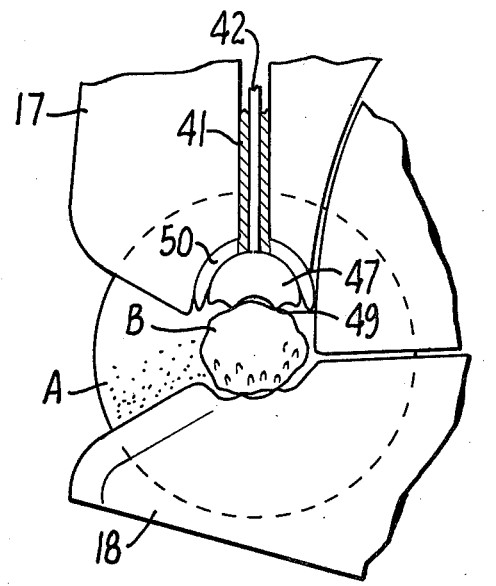
FIGS. 5A and 6A are vertical sectional views as seen from lines 5A—5A and 6A—6A of FIGS. 5, 6, respectively.

A clevis 58 (FIGS. 3, 8) is adjustably secured to the upper end of stem 41 to which pitting spoon 50 is attached and the arms of the clevis project into an open side of block 53 to embrace opposite sides of a roller 59 supported within the block. Thus, upon movement of plunger 56 in one direction by actuation of air cylinder 55 the stem 41 and consequently the pitting spoon 50 will be rotated to move the knives 50' from a position in the plane of blade 17 to the position shown in FIG. 6, and reverse movement of the plunger will move the knives back into slots 48 (FIG. 3).

Frame 51 is rigid on horizontally extending arm 61 of a crank 62 (FIGS. 3, 7), the other arm 63 of which extends downwardly and is pivotally supported at its lower end on a pivot 64 (FIGS. 1, 7) that is on a stationary part of the frame 1. Blade 17 depends from the outer end of arm 61 and a cam follower 65 on its inner end is engageable with a cam 66 (FIG. 1) on the lower end of shaft 4 for effecting raising and permitting lowering of blade 17 when shaft 4 is rotated.

A rod 67 is pivotally connected at 68 with arm 63 of crank 62 at a point intermediate its upper and lower ends (FIGS. 1, 7) and an helical spring 69, through which rod 67 extends, reacts between the end of the rod at pivot 68, and a cap 70 that is adjustable axially of said rod on a sleeve 71 on part of frame 1. Thus the force of spring 69 transmitted to the upper blade 17 to lower the same and to grip the pit may be varied so that the pit-gripping edges of the blades engage the pit with just sufficient force for holding the same during the torque pitting operation and not with so much force as to fracture a sound pit.

Torque Pitting

Upon the pit-gripping portion 47 of blade 17 engaging a sound pit B (FIG. 7) in holding or gripping relation thereto, the elements 16 will grip the two outer surfaces of the halves of the body of the drupe A bisected by blades 17, 18 and will rotate oppositely about their common axis through 360 degrees upon actuation of the Geneva drive 9 to shear the halves of the body from the pit. This is the normal torque pitting operation, and differs from the operation in the patent hereinbefore noted in rotating the halves through 360 degrees instead of 270 degrees.

Spoon Pitting

The terms "spoon pit" and "spoon pitting" are commonly used in the industry relative to pitting that is effected by cutting knives or blades, some of which at one time resembled spoons. Herein the term merely refers to cutting the pit and some surrounding flesh from the halves to distinguish from torque pitting wherein the pits are sheared or torn from the halves.

Figure 6A:
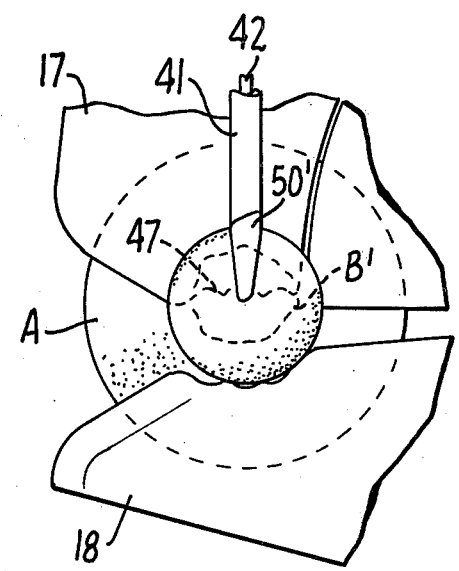

The drupes are delivered onto the lower blade 18 with the suture of each drupe in the plane of the blades 17, 18, hence the split in a pit will be in the same plane and when the upper blade 17 descends to grip the pit the pit-engaging portion 47 thereof will continue downwardly between the pit halves to a position 77 (and indicated in broken line in FIG. 7). Upon this movement a valve actuating element 78 (FIGS. 1, 7) on the outer end of rod 67 will move the blade 17 to position 77' to effect movement of the plunger 56 of air cylinder 55 to move block 53 to broken line position 53' (FIG. 8) for rotating stem 41 to swing spoon 50 to the positions shown in FIG. 6 extending on opposite sides of the split pit B'. The rotation of the drupe halves by cups 16 relative to spoon 50 will then result in cutting the split-pit halves from the drupe halves. It will be noted from FIGS. 6 and 7 that spoon 50 is formed to an inverted U-shape of the approximate configuration of the pit B. The leading edges (in the direction of relative movement between peach halves A and pit B) of the legs 50' of said spoon are sharpened to provide knives to cut the peach flesh adjacent the pit upon rotation of peach halves A by cups 16 (FIGS. 6, 6A). Preferably spoon 50 is formed to embrace pit B' as closely as possible and knives 50' extend around substantially one-half of the periphery of the pit.

The pit-gripping edges on blades 17, 18 additionally serve the function of always locating the pit in the same place, i.e., in the cavity between the pit-gripping edges and on the axis of rotation of peach-gripping elements 16. This enables accurate setting of the spoon 50 in the closest proximity to the pit that is desired so as to cut or "spoon" a minimum of peach flesh with the pit. The relationship of spoon 50 to the pit may be varied by adjusting the position of element 78 on rod 67 (FIG. 7). As a result, the diameter of the spoon pitted cavity may be varied to accommodate for peach varieties having large split pits or for trimming the cavity of pit fragments.

Figure 10:
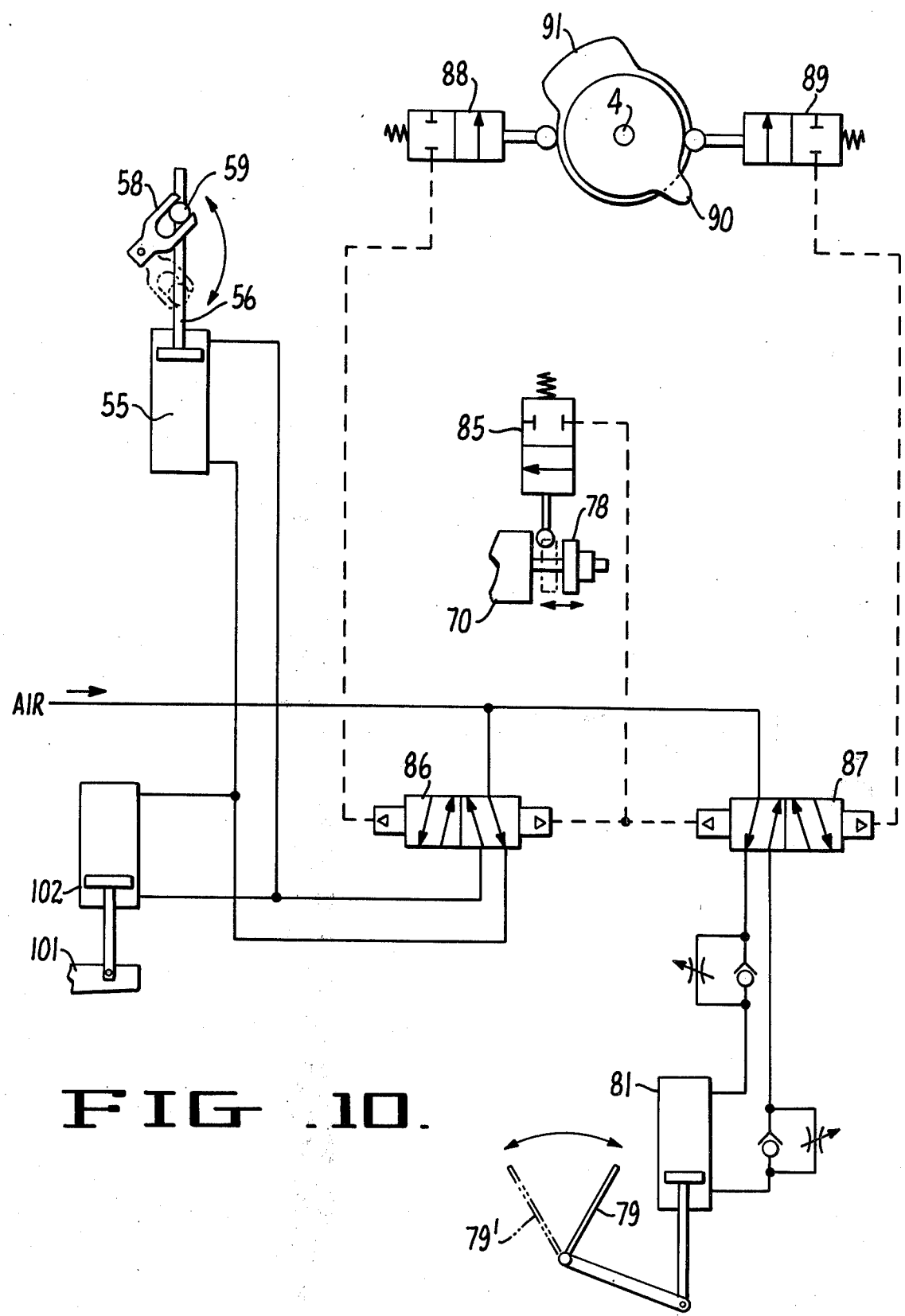
FIG. 10 is a schematic view of the element-actuating control system of the embodiment of FIG. 1.

The peach halves and pits discharged from cups 16 and blades 17, 18 onto the receiver 23 (FIG. 1) drop onto a diverter 79 (FIG. 2) that conducts them, by gravity, to suitable conveyors or collectors. One position of the diverter (solid line in FIGS. 2, 9, 10) will conduct the torque pitted peach halves and whole pits to one conveyor 80 while another position of the diverter will conduct the spoon pitted halves and half pits and the unpitted halves to another conveyor 82. Thus the halves having pits that are split or fractured will be separated from the halves having sound pits. An air cylinder 81 connected with the diverter is actuated to shift the diverter from one position to the other as generally disclosed in U.S. Pat. No. 3,442,313.

The relationship of the strength of the pit and the strength of the bond between the pit and the flesh is different among varieties of peaches and other drupes. In running a peach variety in which the pit is so relatively weak or soft that it cannot be gripped properly for torque pitting, it may be advisable to convert the pitter herein disclosed to an all spoon mode. That may be readily and simply accomplished by merely removing the pit-gripping portion 47 of upper blade 17 carrying pit-gripping teeth 49 so that the upper blade always travels to the position shown in dot dash line in FIG. 7 to initiate spoon pitting.

Operation and Control

The schematic view (FIG. 10) and the semi-diagrammatic view (FIG. 9) show the control of automatic operations of the pitter with respect to drupes having split or unsound pits, and drupes having sound pits by an air system including valve 85 (FIG. 7).

If the pit in the drupe is sound, the element 78 will not actuate valve 85 and thence spoon 50 will remain coplanar with blade 17 and the peach will be torque pitted. In that instance the deflector 79 in its solid-line position will convey the pit and peach halves onto conveyor 80 (FIG. 2).

Upon pit-holding blade 17 (FIG. 9) being moved downwardly to bisect a peach on blade 18 and encountering a split pit, the blade 17 will pass between the halves of the split pit (FIG. 6) and valve 85 (FIGS. 9, 10) will be actuated by movement of element 78 that is operatively connected with blade 17. The actuation of valve 85 shifts or conditions internally piloted valves 86, 87 to actuate cylinders 55, 81 to (a) rotate stem 41 to move the spoon or knives 50 to spoon pitting position relative to split pit B' (FIG. 6) and (b) to move deflector 79 to broken line position 79' (FIGS. 2, 10) for discharge of the split pit and halves onto conveyor 82.

Valves 88, 89 are actuated by cams 91, 90, respectively (FIGS. 1, 9, 10) on cam shaft 4 to reset the condition of valves 86, 87 after each pitting operation or cycle. Whichever of valve 85 or valve 88 first conditions valve 86 sets the position of the latter for the pitting cycle. The position of the beginning of the lobe on cam 91 is timed to condition valve 86 to retain spoon 50 within the plane of blade 17 just before the beginning of the twisting operation of elements 16. In this manner in the event of a "late" split in the pit, or where the blade 17 hesitates upon engaging an apparently sound pit and at the start of or during the twisting operation moves past the edges of the pit, subsequent operation of valve 85 will have no effect on valve 86 or the position of spoon 50.

The lobe on cam 91 is sufficiently long to maintain the conditioning of valve 88 on valve 86 until after blade 17 has been raised to eliminate the conditioning of valve 85. In this manner valve 88 serves to recondition valve 86 after each cycle to position spoon 50 in the plane of blade 17 at the beginning of each successive cycle. In this manner only those peaches are spoon pitted in which the proper relationship exists between the pit and the spoon.

The lobe of cam 90 is of relatively short duration and serves to reset valve 87 and, correspondingly, the position of deflector or diverter 79 only if the type of pitting operation changes between cycles.

In the event of a "late" split pit, valve 87 will shift to a position actuating cylinder 81 to direct the unpitted drupe halves onto the same conveyor 82 as for spoon-pitted peaches, where the unpitted halves may be readily removed upon inspection of the halves on such conveyor.

It will be seen from the above that the pitter of this invention automatically and selectively operates in one of three modes depending upon the type of pit encountered in the peach. If the pit is sound, its edges are held between the pit-gripping means on blades 17, 18 and cups 16 serve to twist the peach halves A loose from the pit B in a normal torque-pitting operation.

If the pit B' is split, upper blade 17 will overtravel, triggering actuating means 55 to move coring spoon 50 from its normally inoperative position in the plane of the bisecting blades to an operative position extending transversely of said plane and embracing opposite sides of pit B' (FIG. 6). In this mode, upon rotation of peach halves A by cups 16 spoon 50 cuts the flesh of the peach half adjacent the split pit through 360 degrees.

In the third mode, upon upper blade 17 momentarily encountering the edge of an apparently sound pit and then moving past the same by fracturing it or passing between its halves or by moving along the outside of the pit, the coring spoon 50 will be retained in its inoperative position and rotation of the peach halves A by cups 16 will serve merely to split the peach in half retaining the halves of the unsound pit therein.

It will be obvious to those skilled in the art that the invention may take other forms than disclosed above within the spirit and scope of the appended claims. For example, pitting spoon 50 may be located in lower blade 18 or any other orientation so long as it embraces substantially half the pit in the operative position.

I claim:

4. In a clingstone peach pitter of the type wherein peach-bisecting blades having pit-gripping means associated therewith move relatively toward each other in substantially the suture plane of the peach to substantially bisect the same to its pit, said pit-gripping means grip the edges of a sound pit and hold the same against rotation, and thereafter peach-gripping cups grip and rotate the peach halves relative to the held pit to shear said halves from said pit, the improvement comprising:
(a) a U-shape coring spoon adjacent said blades in a position to extend around substantially one-half the perimeter of said pit;
(b) said spoon being supported for movement between a normally inoperative position residing in said plane and an operative position extending transversely of said plane and into said peach halves on opposite sides of the pit;
(c) means responsive only to movement of one of said pit-gripping means past the edges of an unsound pit for moving said spoon to said operative position whereby upon rotation of said peach halves by said cups said spoon will cut a core including said unsound pit from said halves.

5. The improvement of claim 4, including:
(d) means for adjusting the location of said spoon relative to the pit.

6. The improvement of claim 4, including:
(d) means for automatically disabling said responsive means upon said one pit-gripping means moving past the edges of an unsound pit at substantially the time said peach-gripping cups begin to rotate.

1. In a clingstone peach pitter of the type wherein peach-bisecting blades having pit-gripping means associated therewith are adapted to move relatively toward each other in substantially the suture plane of a peach presented to said blades to substantially bisect the peach to its pit, said pit-gripping means are adapted to grip the edges of a sound pit and to hold the same against rotation, and peach-gripping cups are adapted to grip and rotate the peach halves relative to the held pit to shear said halves from said pit, the improvement comprising:
(a) an arcuate coring spoon normally residing in an inoperative position in said plane and supported for movement to an operative position extending transversely of said plane and into said peach halves adjacent the pit;
(b) detecting means for detecting the presence of an unsound pit in a peach presented to said blades;
(c) actuating means responsive only to the detection of an unsound pit by said detecting means for moving said spoon to said operative position and for rotating said peach halves relative thereto about an axis extending through substantially the center of the pit, thereby cutting a core including said unsound pit from said halves.

2. The improvement of claim 1, in which:
(d) the detection of an unsound pit by said detecting means is movement of one of said pit-gripping means past the edges of an unsound pit.

3. The improvement of claim 1, in which:
(d) said actuating means includes said peach-gripping cups rotating said peach halves relative to said coring spoon in said operative position.

* * * * *